United States Patent [19]

Matsui

[11] Patent Number: 5,687,280
[45] Date of Patent: Nov. 11, 1997

[54] SPEECH INPUT DEVICE INCLUDING DISPLAY OF SPATIAL DISPLACEMENT OF LIP POSITION RELATIVE TO PREDETERMINED POSITION

[75] Inventor: Kenji Matsui, Hirakata, Japan

[73] Assignee: Matsushita Electric Industrial Co., Ltd., Kadoma, Japan

[21] Appl. No.: 145,861

[22] Filed: Oct. 29, 1993

[30] Foreign Application Priority Data

Nov. 2, 1992 [JP] Japan ................................ 4-294117

[51] Int. Cl.[6] ................................................ G10L 5/06
[52] U.S. Cl. ............................................................ 395/2.4
[58] Field of Search ................................ 382/6; 381/43; 364/513.5; 782/6; 395/2.4, 2.43

[56] References Cited

U.S. PATENT DOCUMENTS

| | | | |
|---|---|---|---|
| 4,449,189 | 5/1984 | Feix et al. | 364/513.5 |
| 4,769,845 | 9/1988 | Nakamura | 381/43 |
| 4,841,575 | 6/1989 | Welsh et al. | 381/36 |
| 4,961,177 | 10/1990 | Uehara | 395/2.82 |
| 4,975,960 | 12/1990 | Petajan | 381/43 |
| 5,015,179 | 5/1991 | Resnick | 434/185 |
| 5,148,477 | 9/1992 | Neely et al. | 382/6 |
| 5,214,711 | 5/1993 | Neely et al. | 782/6 |
| 5,473,726 | 12/1995 | Marshall | 395/2.4 |

FOREIGN PATENT DOCUMENTS

| | | |
|---|---|---|
| 60-188998 | 9/1985 | Japan . |
| 62-239231 | 10/1987 | Japan . |

Primary Examiner—Allen R. MacDonald
Assistant Examiner—Robert C. Mattson
Attorney, Agent, or Firm—Renner, Otto, Boisselle, Sklar

[57] ABSTRACT

A speech input device includes a speech input section for converting the input speech made by a speaker into an electric signal and outputting the electric signal, and a display section for displaying information indicating a spatial displacement of the position of the lip portion of the speaker from a predetermined position.

9 Claims, 8 Drawing Sheets

SPEECH INPUT DEVICE INCLUDING DISPLAY OF SPATIAL DISPLACEMENT OF LIP POSITION RELATIVE TO PREDETERMINED POSITION

BACKGROUND OF THE INVENTION

1. Field of the Invention

The present invention relates to a speech input device, and more specifically, to a speech input device capable of supplying a stable speech signal to an apparatus such as a speech recognition apparatus or the like.

2. Description of the Related Art

In most cases, a microphone is used as a speech input device for the input of speech into a speech recognition apparatus. There are various types of microphones such as a hand-held type, a desk-top type, a necktie-pin type, a head-mounted type, and a receiver type. Among these types of microphones, the head-mounted type or the receiver type microphone provides a relatively favorable speech recognition capability. This is because, when such a microphone is used, a lip portion of the speaker can be in the vicinity of the microphone.

Further, a speech input device for inputting both speech and an image of a lip portion or a face of the speaker by use of a microphone and a TV camera is disclosed in Japanese Laid-Open Patent Publication Nos. 60-188998 and 62-239231, for example. The purpose of such a speech input device is to further improve the speech recognition capability by use of an image of the lip portion of the speaker.

FIG. 9 shows a configuration of a conventional speech input device connected to a speech recognition apparatus. Referring to FIG. 9, speech made by the speaker is converted into an electric signal by a speech input section 110 such as a microphone, and the electric signal is output to a speech recognition apparatus. Simultaneously, a face image of the speaker is converted into an image signal by an image input section 120. A lip image extracting section 130 extracts a portion of the image signal corresponding to a lip portion of the speaker and outputs only the portion of the image signal to the speech recognition apparatus.

The above conventional speech input device has problems as follows: It fails in supplying a stable speech signal to the speech recognition apparatus, because the distance between the lip portion of the speaker and the microphone is not kept constant. To overcome this trouble, it is required to provide the speech recognition apparatus with a function of correcting an input speech signal in consideration of a variation in the distance between the lip portion of the speaker and the microphone. Another problem is that in the conventional speech input device, it is required to extract an image of the lip portion of the speaker from the entire image of the face. In particular, when the speaker's face moves, it is difficult to achieve this extraction with high accuracy.

SUMMARY OF THE INVENTION

The speech input device of this invention includes: a speech input means for converting input speech made by a speaker into an electric signal and outputting the electric signal; and a display means for displaying information indicating a spatial displacement of the position of a lip portion of the speaker from a predetermined position.

In one embodiment, the speech input device further includes an image input means for converting an input image of a lip portion of the speaker into an electric signal and outputting the electric signal.

In another embodiment, the display means has a mirror surface for reflecting the lip portion of the speaker, the mirror surface having a mark for displaying the predetermined position.

In still another embodiment, the predetermined position is determined in association with the position of the speech input means.

In still another embodiment, the speech input device further includes: an image input means for converting an input image of the lip portion of the speaker into an electric signal and outputting the electric signal; a position identifying means for identifying the position of the lip portion of the speaker based on the electric signal output from the image input means; and a position comparing means for comparing the position of the lip portion of the speaker identified by the position identifying means with the predetermined position and outputting the result of the comparison, wherein the display means displays information indicating a spatial displacement of the position of the lip portion of the speaker from the predetermined position based on the result of the comparison obtained by the position comparing means.

In still another embodiment, the predetermined position is determined in association with the position of the speech input means and the position of the image input means.

In still another embodiment, the speech input device is connected to a speech processing unit, the speech input device further includes: an image input means for converting an input image of a lip portion of the speaker into an electric signal and outputting the electric signal, the speech processing unit includes: a position identifying means for identifying the position of the lip portion of the speaker based on the electric signal output from the image input means of the speech input device; and a position comparing means for comparing the position of the lip portion of the speaker identified by the position identifying means with the predetermined position and outputting the result of the comparison, wherein the display means of the speech input device displays information indicating a spatial displacement of the position of the lip portion of the speaker from the predetermined position based on the result of the comparison obtained by the position comparing means of the speech processing unit.

In still another embodiment, the predetermined position is determined in association with the position of the speech input means and the position of the image input means.

Thus, the invention described herein makes possible the advantages of (1) providing a speech input unit capable of supplying a stable speech signal to a speech recognition apparatus, and (2) providing a speech input device capable of eliminating the process of extracting an image corresponding to the lip portion of the speaker from the entire image of the face.

These and other advantages of the present invention will become apparent to those skilled in the art upon reading and understanding the following detailed description with reference to the accompanying figures.

DESCRIPTION OF THE PREFERRED EMBODIMENTS

The present invention will be described by way of example with reference to the accompanying drawings as follows:

EXAMPLE 1

Figure 1A:
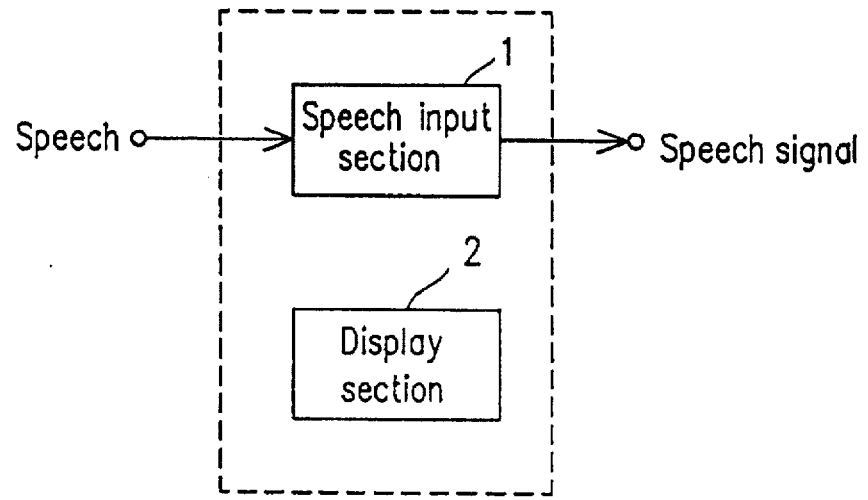
FIG. 1A is a block diagram showing a configuration of a speech input device according to the present invention.

FIG. 1A shows a configuration of a speech input device of the present invention. The speech input device of this example includes a speech input section 1 and a display section 2. The speech input section 1 converts input speech into an electric signal and outputs the electric signal to an external device (not shown). A microphone, for example, is used as the speech input section 1. As examples of the external device, there may be a speech processing unit and a speech recognition apparatus. The display section 2 displays a spatial displacement of the position of a lip portion of the speaker from a predetermined position. The predetermined position is determined in advance so that speech can be most stably input to the speech input section 1 when the position of the lip portion of the speaker matches that position. The display section 2 has, for example, a mirror surface for reflecting at least the lip portion of the speaker. Such a mirror surface has a mark thereon for indicating the predetermined position. The mark can be of any shape as far as it enables the speaker to recognize the predetermined position at which his or her lip portion should be positioned. For example, the shape of the mark includes a cross, an ellipse, and a trapezoid. The speaker adjusts the position of his or her lip portion so that the position of the reflection of the lip portion on the mirror surface matches the marked predetermined position and then starts speaking maintaining this position. Thus, the speaker can keep at all times his or lip portion at a proper position with respect to the speech input section 1.

Figure 1B:
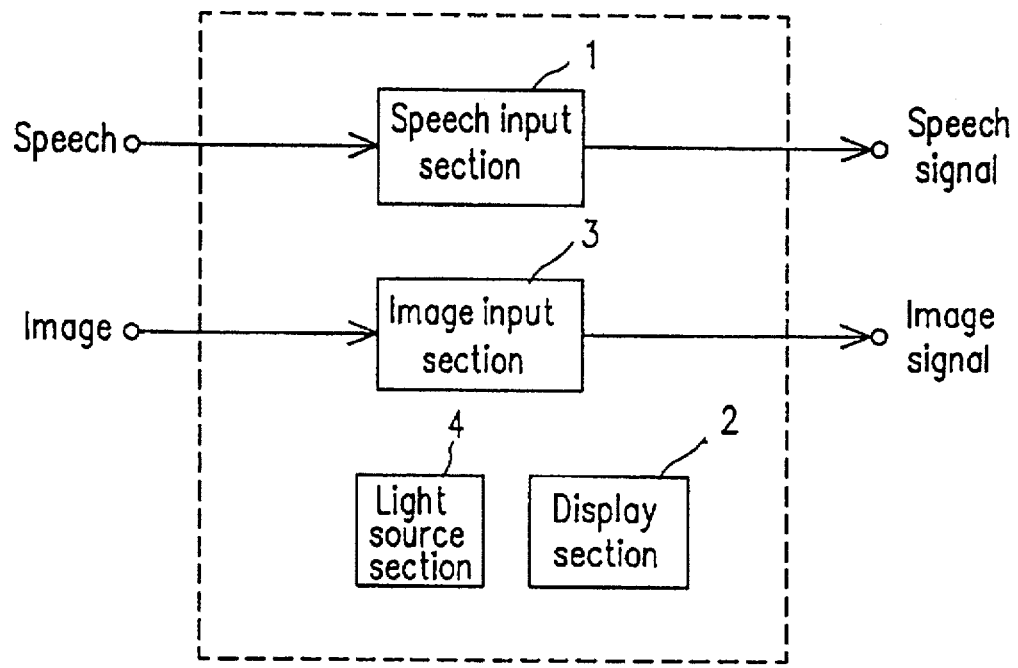
FIG. 1B is a block diagram showing a configuration of a modification of the speech input device of FIG. 1A.

As shown in FIG. 1B, the speech input device may additionally include an image input section 3 which converts an input image into an electric signal and outputs the electric signal to an external device (not shown). A TV camera or a CCD, for example, is used as the image input section 3. The image input to the image input section 3 includes at least an image of the lip portion of the speaker. When the speech input device is connected to an external device such as a speech recognition apparatus, the image of the lip portion of the speaker is used to detect an interval of the speech where speech exists on the basis of the speech signal output from the speech input section 1. This contributes to reducing the probability of the speech recognition apparatus mistakenly recognizing noise surrounding the speaker as the speaker's speech under a noisy environment, especially under an environment where the noise level is abnormally high by surrounding sound of music, chats, and the like.

When the speech input device includes the image input section 3 as described above, it preferably has a light source section 4 for irradiating at least the lip portion of the speaker with a sufficient amount for obtaining an accurate image of the lip portion.

Figure 2:
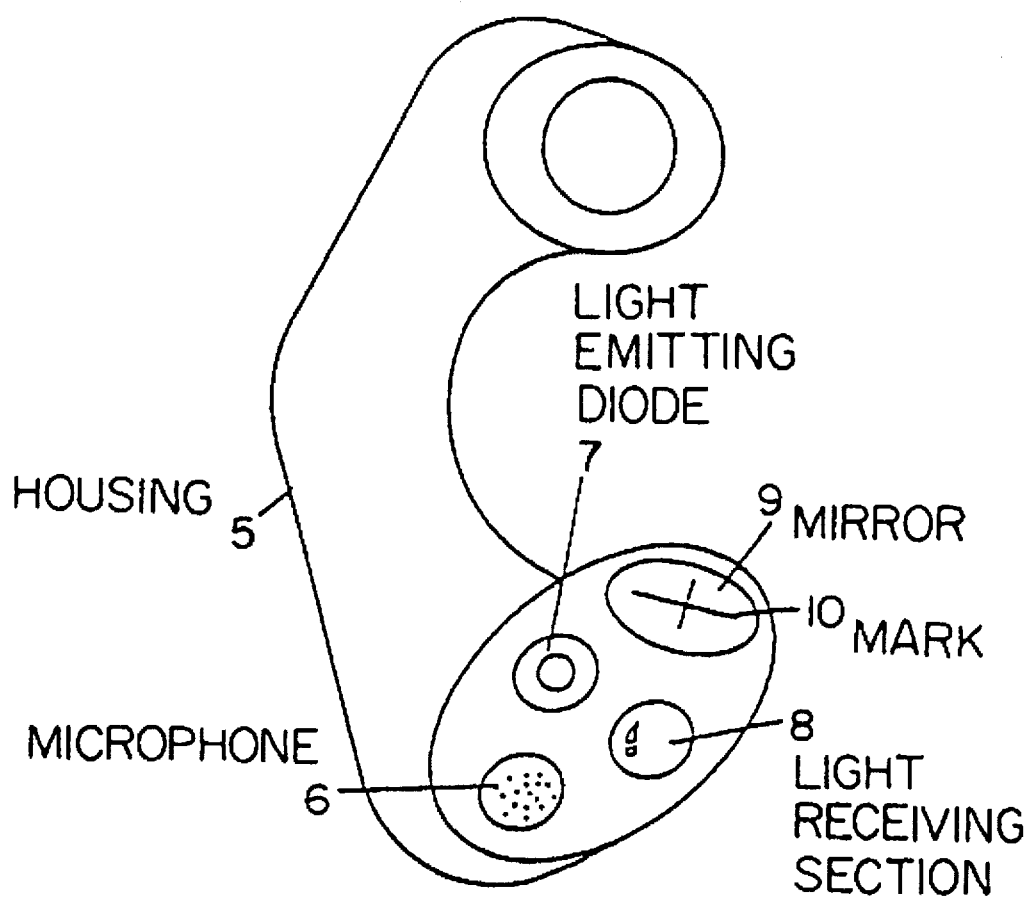
FIG. 2 is a schematic view showing a configuration arrangement of the speech input device of FIG. 1B.

FIG. 2 shows a concrete arrangement of the speech input device of this example. This speech input device includes a housing 5 having a microphone 6 and a mirror 9. Speech given by the speaker is input to the microphone 6. The mirror 9 is provided with a mark 10 thereon. When speaking, the speaker positions his or her lip portion so that the center of the reflection of his or her lip portion on the mirror matches the center of the mark 10. The mirror 9 is disposed on the housing 5 properly so that the distance between the lip portion of the speaker and the microphone 6 is kept substantially constant when the speaker speaks in a manner as described above. It has been confirmed by experiments that the proper distance between the lip portion of the speaker and the microphone 6 is almost invariable even when the speaker changes. The position and the angle of the mirror may be changeable so that the distance between the lip portion of the speaker and the microphone 6 can be finely adjusted.

In this concrete example, the housing 5 also includes a light emitting diode 7 for irradiating the lip portion of the speaker and a light receiving section 8 for receiving an image including at least the lip portion of the speaker.

Referring to FIG. 2, the method of inputting speech to the speech input device having the above-described configuration will be described.

The speaker adjusts the positioning of his or her lip portion so that he or she can see the reflection of the lip portion on the mirror 9 and that the center of the reflected lip portion matches the center of the mark 10 on the mirror 9. The housing 5 preferably has a shape with which, when the speaker holds the housing 5 in a natural manner, a favorable positional relationship between the lip portion of the speaker and the housing 5 can be established at once without the necessity of further adjustment. This is because such a shape makes it possible to restrict the possible displacement of the position of the lip portion of the speaker from the predetermined position within a specified range. An example of such a preferable shape is that of an normal telephone set. Then, the speaker speaks, holding the housing 5 so that the reflection of the lip portion on the mirror 9 keeps matching the mark 10 on the mirror 9. During speaking, the lip portion of the speaker are irradiated by the light emitting diode 7 with a sufficient amount for allowing the light receiving section 8 to receive an image of the lip portion.

Thus, according to the speech input device of this example, since the distance between the lip portion of the speaker and the speech input section 1 can be kept substantially constant, the speaker can keep at all times his or her lip portion at a proper position with respect to the speech input section 1. This allows the speech input section 1 to output a stable speech signal at all times. As a result, when the speech input device is connected to an external device such as a speech recognition apparatus, it is not necessary for the external unit to have a function of correcting the speech signal input thereto in consideration of a variation in the distance between the lip portion of the speaker and the speech input section 1.

EXAMPLE 2

Figure 3:
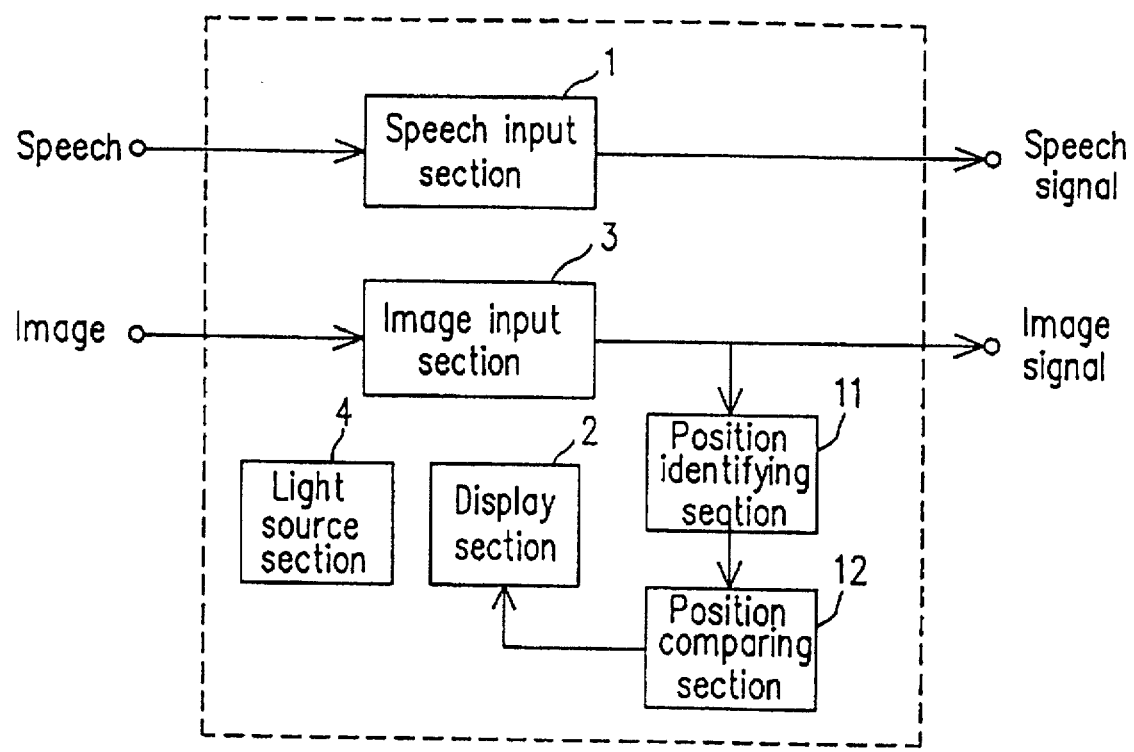
FIG. 3 is a block diagram showing a configuration of another speech input device according to the present invention.

FIG. 3 shows a configuration of another speech input device of the present invention. The speech input device of this example includes a speech input section 1, a display section 2, and an image input section 3. The speech input section 1 converts input speech into an electric signal and outputs the electric signal to an external device (not shown). The image input section 3 converts an input image of the lip portion into an electric signal and outputs the electric signal to an external device (not shown). The display section 2 displays a spatial displacement of the position of the lip portion of the speaker from a predetermined position. The predetermined position is determined in advance so that speech can be most stably input to the speech input section 1 and only an image of the lip portion is input to the image input section 3 when the position of the lip portion of the speaker matches that position. A liquid crystal display or a CRT, for example, is used as the display section 2. As in Example 1, the speech input device preferably has a light source section 4 for irradiating the lip portion of the speaker with a sufficient amount for obtaining an accurate image of the lip portion.

According to the speech input device of this example, since an image of only the lip portion of the speaker is input to the image input section 3, the number of photosensitive elements required for the image input section 3 is as small as 32×32 arranged in a matrix. Conventionally, 512×512 photosensitive elements are required for the input of an image of the entire face of the speaker. Thus, with the speech input device of this example where an image of only the lip portion of the speaker is input to the image input section 3, the number of the photoelectric transfer elements can be greatly reduced.

Another advantage of this example which is more important is that, by greatly reducing the number of the photoelectric transfer elements, the frequency band of the speech signal output from the speech input section 1 is substantially the same as that of the image signal output from the image input section 3. For example, when 32×32 pixels are taken at a rate of 100 msec./frame, approximately 10000 pixels are processed per second. The frequency band of the image signal in this case is approximately 10 KHz. Accordingly, the speech signal and the image signal can be processed by the same processor in an external device such as a speech recognition apparatus connected to the speech input device.

The speech input device additionally includes a position identifying section 11 and a position comparing section 12. These sections are used for displaying a spatial displacement of the position of the lip portion of the speaker from the predetermined position on the display section 2.

Figure 4:
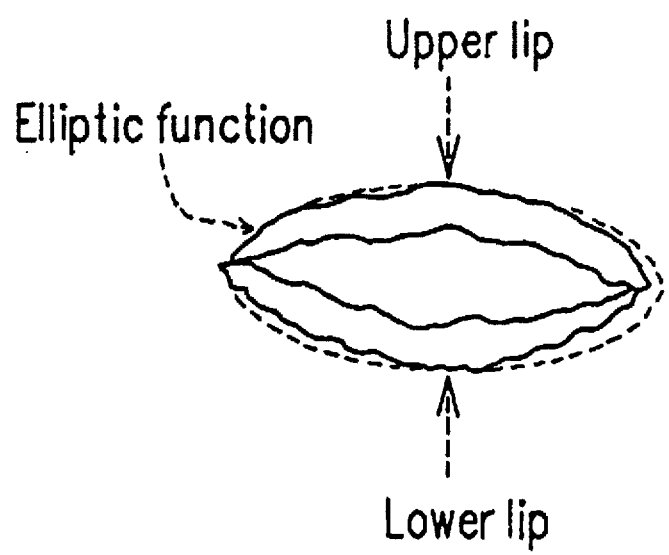
FIG. 4 illustrates a method of identifying the position of the lip portion of the speaker.
Figure 5:
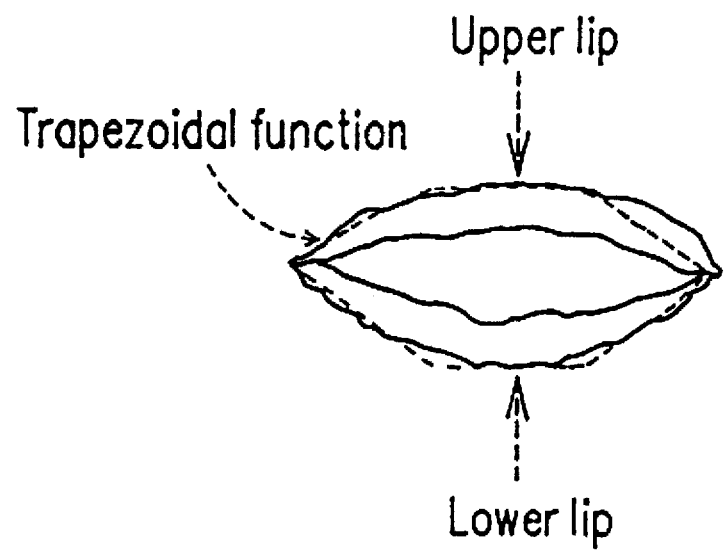
FIG. 5 illustrates another method of identifying the position of the lip portion of the speaker.

The position identifying section 11 identifies the position of the lip portion of the speaker based on an electric signal output from the image input section 3 representing the image of the lip portion. The position of the lip portion can be identified simply and effectively by pattern matching. For example, the position identifying section 11 identifies the position of the lip portion of the speaker based on information representing a shading degree of an input image by the use of the knowledge on the lip portion that the shape thereof resembles a trapezoid. More specifically, as shown in FIG. 4, the position identifying section 11 presumes an elliptic function which roughly matches the outer frame of the lip portion. The presumed elliptic function is identified as the position of the lip portion. A trapezoidal function may be used instead of the elliptic function, as shown in FIG. 5.

The position comparing section 12 compares the position of the lip portion identified by the position identifying section 11 with a predetermined position, and outputs the result of the comparison. The predetermined position which is stored in advance in the position comparing section 12 is determined so that both the distances between the lip portion of the speaker and the speech input section 1 and the lip portion of the speaker and the image input section 3 are kept substantially constant when the position of the lip portion identified by the position identifying section 11 matches the predetermined position. The result of the comparison obtained by the position comparing section 12 are supplied to the display section 2. The display section 2 displays a spatial displacement of the position of the lip portion of the speaker from the predetermined position based on the result of the comparison.

Then, how the spatial displacement of the position of the lip portion of the speaker from the predetermined position is displayed on the display section 2 will be described.

In general, in order to display the spatial displacement, it is required to display the displacement in a three-dimension. However, it is possible to consider that coordinates of the lip portion in an axis perpendicular to the plane which contacts the lip portion are substantially constant. Accordingly, it is sufficient to display the displacement in a one-dimension or two-dimension.

Figure 6A:
FIGS. 6A to 6E respectively show examples of the indication of a spatial displacement of the lip portion of the speaker from a predetermined position.
Figure 6B:
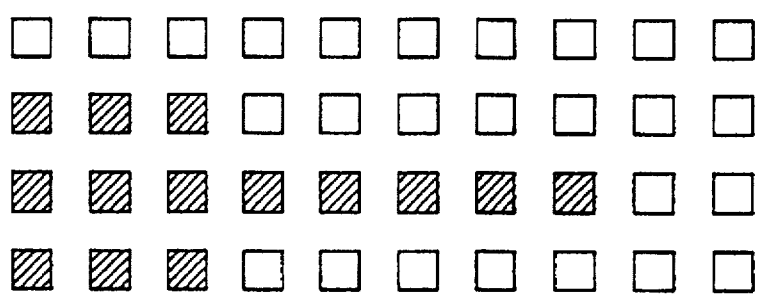
Figure 6C:
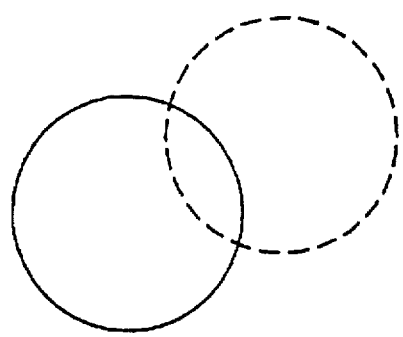
Figure 6D:
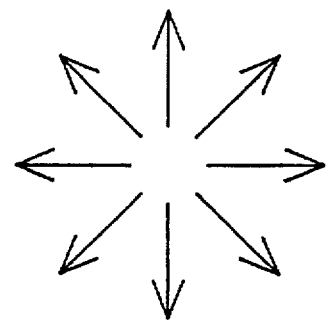
Figure 6E:
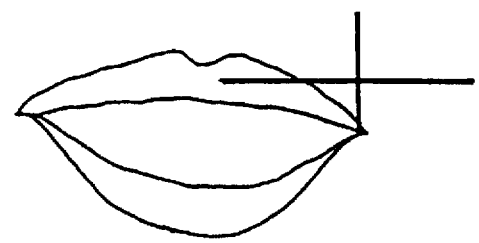

FIGS. 6A to 6E show an exemplary style for displaying a spatial displacement of the position of the lip portion of the speaker from the predetermined position. In FIG. 6A, the spatial displacement is displayed by the use of a single indicator. In this case, the indicator is set, for example, so that the degree in the indicator increases when the spatial displacement is smaller, and vice versa. In FIG. 6B, the spatial displacement is displayed by the use of a plurality of indicators so that the direction of the spatial displacement can be shown. In FIG. 6C, the spatial displacement is displayed two-dimensionally by the use of the degree of overlap of two circles. In this figure, the position of the lip portion of the speaker is shown by a solid line and the predetermined position by a dash line. In FIG. 6D, the spatial displacement is displayed two-dimensionally by the use of arrows representing the directions of the displacement. In this case, one of eight arrows representing eight directions, i.e., upward, downward, rightward, leftward, upper-rightward, upper-leftward, lower-rightward, and lower-leftward directions is displayed depending on the direction of the displacement. For example, when the position of the lip portion of the speaker is displaced from the predetermined position in the upward direction, the arrow representing the downward direction is displayed. In FIG. 6E, the spatial displacement is displayed two-dimensionally by indicating a mark showing the predetermined position on the display, together with the image of the lip portion input through the image input section 3. It will be easily understood by those skilled in the art that a similar effect can also be obtained by generating an alarm sound warning the spatial displacement, instead of displaying the spatial displacement as described above or in addition thereto.

Figure 7:
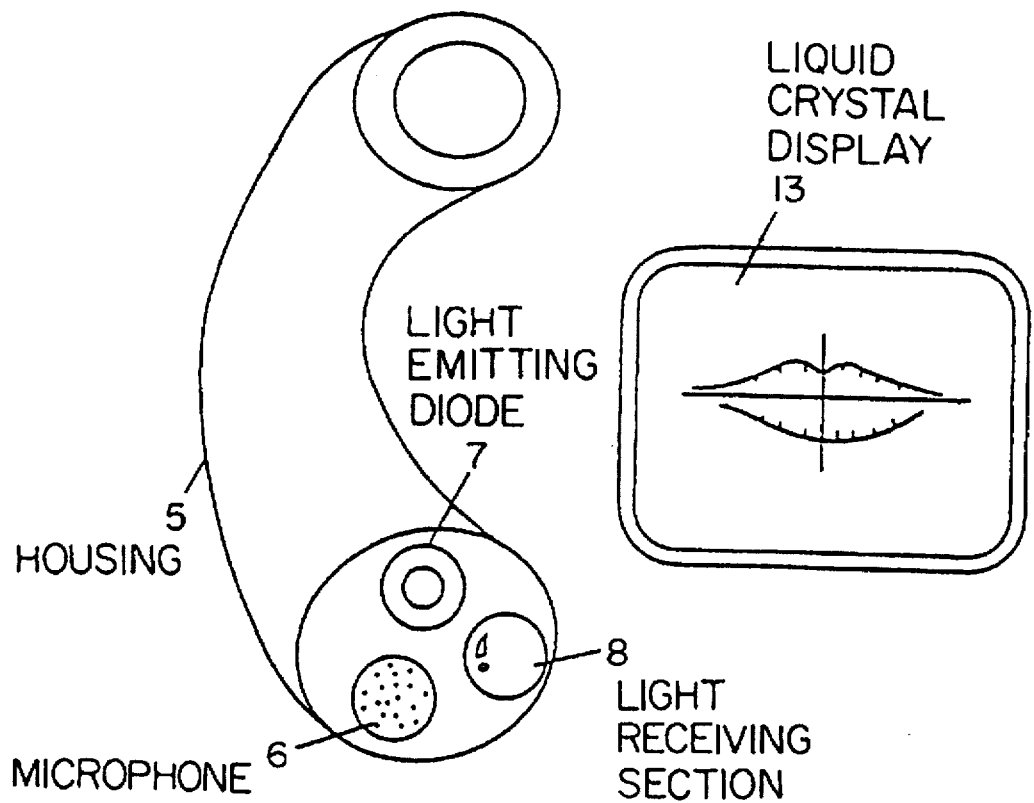
FIG. 7 is a schematic view showing a configuration arrangement of the speech input device of FIG. 3.

FIG. 7 shows a concrete arrangement of the speech input device of this example. This speech input device includes a housing 5 having a microphone 6, a light emitting diode 7, and a light receiving section 8. A liquid crystal display 13 may be disposed on the housing 5, but it is preferably separated from the housing 5 so that the speaker can easily recognize the spatial displacement. A position identifying section 11 and a position comparing section 12 are not shown in FIG. 7 but are disposed inside the housing 5.

Referring to FIG. 7, the method of inputting speech to the speech input device having the above-described structure will be described.

Before the start of speaking, the speaker adjusts the positioning of his or her lip portion with respect to the housing 5 so that the spatial displacement of his or her lip portion displayed on the liquid crystal display 13 from the predetermined position becomes zero. Thereafter, the speaker speaks, holding the housing 5 so that the above adjusted position of the lip portion can be maintained. During speaking, the lip portion of the speaker is irradiated by the light emitting diode 7 with a sufficient amount for allowing the light receiving section 8 to receive an image of the lip portion.

Thus, according to the speech input device of this example, since both the distance between the lip portion of the speaker and the speech input section 1 and the distance between the lip portion of the speaker and the image input section 3 can be kept substantially constant, the speaker can keep at all times his or her lip portion at a fixed position with respect to the speech input section 1 and the image input section 3. This allows the speech input section 1 to output a constant speech signal and the image input section 3 to output a constant image signal. Further, since only an image of the lip portion of the speaker is input to the image input section 3, it is not necessary for the speech input device to have a function of extracting an image of the lip portion from the entire image of the face. This makes it possible to obtain an image of the lip portion with high accuracy.

Further, when the speech input device is connected to an external device such as a speech recognition apparatus, it is not necessary for the external device to have a function of correcting the speech signal input thereto in consideration of a variation in the distance between the lip portion of the speaker and the speech input section 1. Moreover, since only an image signal corresponding to the lip portion of the speaker is supplied to the external device, it is not necessary for the external unit to conduct a process of extracting an image of the lip portion from the entire image of the face. Furthermore, since the frequency band of the speech signal output from the speech input section 1 is substantially the same as that of the image signal output from the image input section 3, it is possible to process the speech signal and the image signal in the same processor in the external device.

As described above, the speech input device of this example has the position identifying section 11 and the position comparing section 12. However, these sections are not necessarily included in the speech input device, but preferably included in the external device such as a speech recognition apparatus. This is because, since the external device normally has a processor for processing a speech signal and an image signal, such a processor can be utilized for the processing required in the position identifying section 11 and the position comparing section 12.

Figure 8:
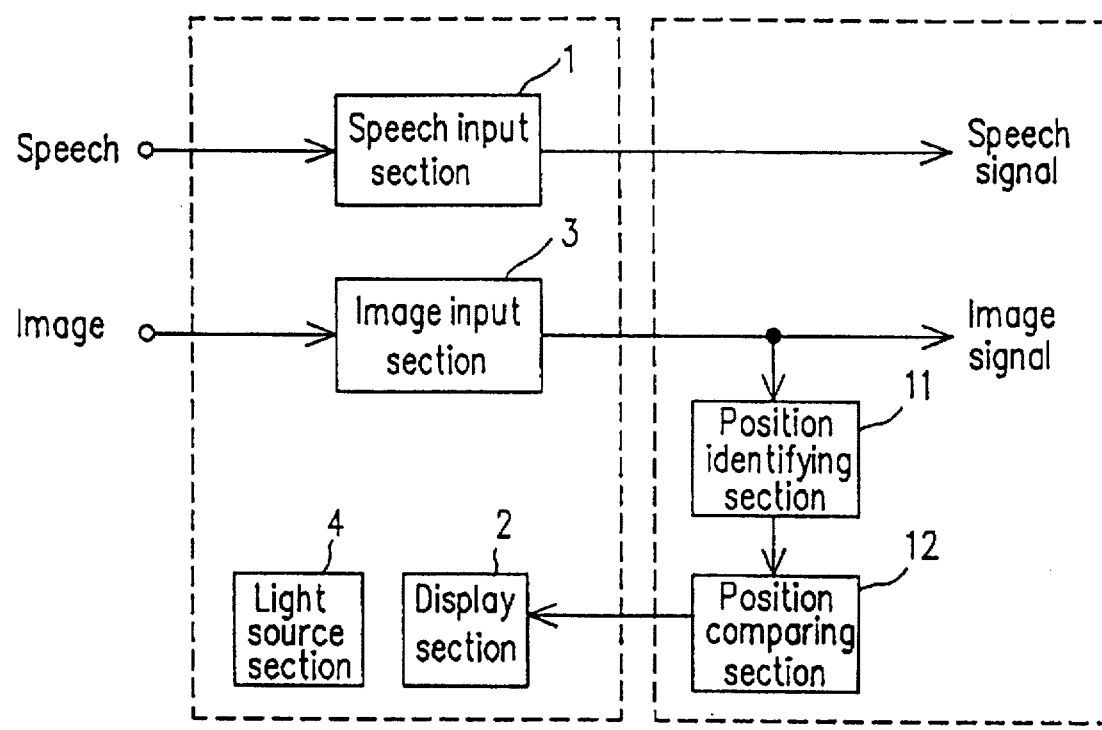
FIG. 8 is a block diagram showing a configuration of a modification of the speech input device of FIG. 3.
Figure 9:
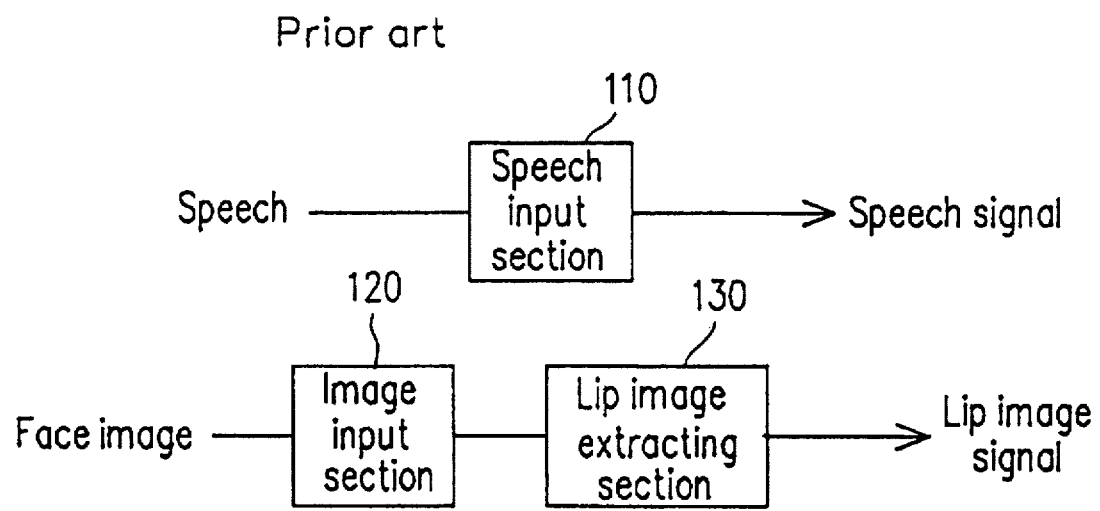
FIG. 9 is a block diagram showing a configuration of a conventional speech input device.

FIG. 8 shows a modification of the speech input device of this example, in which the position identifying section 11 and the position comparing section 12 are included in the external device. The functions and the operation of the speech input device shown in FIG. 8 are the same as those of the speech input unit shown in FIG. 3. Therefore, the description thereof is omitted.

Thus, according to the present invention, since the distance between the lip portion of the speaker and the speech input section 1 can be kept substantially constant, the speaker can keep at all times his or her lip portion at a proper position with respect to the speech input section 1. This allows a stable speech signal to be output from the speech input section 1 at all times.

Further, according to the speech input device of Example 2, the distance between the lip portion of the speaker and the image input section 3 can also be kept substantially constant. Accordingly, the speaker can keep at all times his or her lip portion at a proper position with respect to the image input section 3. This allows a stable image signal to be output from the image input section 3.

Moreover, since only an image of the lip portion of the speaker is input to the image input section 3, it is not necessary for the image input section 3 to have a function of extracting an image of the lip portion from the entire image of the face. This makes it possible to obtain an image of the lip portion with high accuracy.

Furthermore, since the frequency band of the speech signal output from the speech input section 1 is substantially the same as that of the image signal output from the image input section 3, it is possible to process the speech signal and the image signal in the same processor in an external device such as a speech recognition apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A speech input device comprising:
    a speech input means for converting the input speech made by a speaker into an electric signal and outputting the electric signal; and
    a display means for displaying information indicating a spatial displacement of the position of the lip portion of the speaker from a predetermined position.

2. A speech input device according to claim 1, further comprising an image input means for converting an input image of the lip portion of the speaker into an electric signal and outputting the electric signal.

3. A speech input device according to claim 1, wherein the display means has a mirror surface for reflecting the lip portion of the speaker, the mirror surface having a mark for displaying the predetermined position.

4. A speech input device according to claim 1, wherein the predetermined position is determined relative to the position of the speech input means.

5. A speech input device according to claim 1, further comprising:
    an image input means for converting an input image of the lip portion of the speaker into an electric signal and outputting the electric signal;
    a position identifying means for identifying the position of the lip portion of the speaker based on the electric signal output from the image input means; and
    a position comparing means for comparing the position of the lip portion of the speaker identified by the position identifying means with the predetermined position and outputting the result of the comparison,
    wherein the display means displays information indicating a spatial displacement of the position of the lip portion of the speaker from the predetermined position based on the result of the comparison obtained by the position comparing means.

6. A speech input device according to claim 5, wherein the predetermined position is determined relative to the position of the speech input means and the position of the image input means.

7. A speech input device according to claim 1, wherein the speech input device is connected to a speech processing unit, the speech input device further comprising:

an image means for converting an input image of a lip portion of the speaker into an electric signal and outputting the electric signal, the speech processing unit comprising:

a position identifying means for identifying the position of the lip portion of the speaker based on the electric signal output from the image input means of the speech input device; and a position comparing means for comparing the position of the lip portion of the speaker identified by the position identifying means with the predetermined position and outputting the result of the comparison, wherein the display means of the speech input device displays information indicating a spatial displacement of the position of the lip portion of the speaker form the predetermined position based on the result of the comparison obtained by the position comparing means of the speech processing unit.

8. A speech input device according to claim 7, wherein the predetermined position is determined relative to the position of the speech input means and the position of the image input means.

9. A speech input device according to claim 1, wherein the information displayed by the display means is functional to provide the speaker with visual feedback as to a position of the lip portion which the speaker is desired to maintain.

* * * * *